US009552324B2

(12) United States Patent
Cardona et al.

(10) Patent No.: US 9,552,324 B2
(45) Date of Patent: *Jan. 24, 2017

(54) DYNAMIC DATA COLLECTION COMMUNICATION BETWEEN ADAPTER FUNCTIONS

(71) Applicant: International Business Machines Corporation, Armonk, NY (US)

(72) Inventors: Omar Cardona, Cedar Park, TX (US); Baltazar De Leon, III, Austin, TX (US); Marcus B. Grande, Pflugerville, TX (US); Brian W. Hart, Austin, TX (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,417

(22) Filed: Aug. 14, 2015

(65) Prior Publication Data

US 2015/0347347 A1    Dec. 3, 2015

Related U.S. Application Data

(63) Continuation of application No. 14/073,838, filed on Nov. 6, 2013.

(51) Int. Cl.
| | |
|---|---|
| *G06F 15/173* | (2006.01) |
| *G06F 13/30* | (2006.01) |
| *G06F 13/42* | (2006.01) |
| *G06F 13/364* | (2006.01) |
| *G06F 13/40* | (2006.01) |
| *G06F 13/38* | (2006.01) |

(52) U.S. Cl.
CPC .......... *G06F 13/4282* (2013.01); *G06F 13/30* (2013.01); *G06F 13/364* (2013.01); *G06F 13/385* (2013.01); *G06F 13/404* (2013.01)

(58) Field of Classification Search
CPC ...... G06F 13/30; G06F 13/364; G06F 13/385; G06F 13/404; G06F 13/4282
See application file for complete search history.

(56) References Cited

U.S. PATENT DOCUMENTS

| 4,665,500 | A  | * | 5/1987  | Poland ............... G06F 7/535 708/628 |
| 7,506,214 | B2 |   | 3/2009  | Anglin et al. |
| 7,809,912 | B1 | * | 10/2010 | Raizen ................ G06F 3/0617 707/640 |
| 8,332,613 | B1 | * | 12/2012 | Glade .................. G06F 3/0617 711/152 |

(Continued)

OTHER PUBLICATIONS

IBM, "Autonomic On-Demand Adapter Dump," IP.com No. IPCOM000018620D, Jul. 28, 2003, 4 pages.

*Primary Examiner* — Nimesh G Patel
(74) *Attorney, Agent, or Firm* — VanLeeuwen & VanLeeuwen; Diana R. Gerhardt (57) ABSTRACT

An approach is provided that collects data from a multi-function adapter that is used by multiple functions. In the approach, a master function is dynamically selected from the group of functions. The approach further allows the master function to perform a disruptive adapter data collection while inhibiting performance of disruptive adapter data collection processes by the other (non-master) functions.

7 Claims, 7 Drawing Sheets

(56) References Cited

U.S. PATENT DOCUMENTS

| | | | |
|---|---|---|---|
| 2002/0120428 A1* | 8/2002 | Christiaens | G06F 9/465 |
| | | | 702/186 |
| 2011/0208948 A1* | 8/2011 | Knight | G06F 11/1497 |
| | | | 712/31 |
| 2014/0040669 A1* | 2/2014 | Davis | G06F 11/3636 |
| | | | 714/37 |
| 2015/0261713 A1* | 9/2015 | Kuch | G06F 9/44505 |
| | | | 710/104 |

* cited by examiner

DYNAMIC DATA COLLECTION COMMUNICATION BETWEEN ADAPTER FUNCTIONS

BACKGROUND OF THE INVENTION

Modern networks adapters (e.g., Converged Network Adapters (CNAs), etc.) include multiple protocols and are represented by multiple Peripheral Component Interconnect (PCI) functions while being mapped to a single physical device (the actual adapter). From the operating system perspective, each function appears as a stand alone device, however at the device driver level, each of the functions needs to be able to communicate with each other for proper management and serialization of concurrent and redundant adapter and function firmware (FW), such as in performing FW dumps. FW dumps can have a multitude of scopes and impacts to be taken into account in order to preserve granular availability and serviceability. For example, network interface controller (NIC) functions may share a firmware image while Fibre Channel or Remote Direct Memory Access (RDMA) functions might not share an image. An RDMA functions firmware dump may include NIC function firmware and can also be a disruptive operation. Any of the functions firmware dump may be disruptive across the entire adapter. Lastly, functions are fully dynamic, in traditional systems, it is difficult or impossible to identify which function running at the adapter will perform a disruptive firmware dump.

SUMMARY

An approach is provided that collects data from a multi-function adapter that is used by multiple functions. In the approach, a master function is dynamically selected from the group of functions. The approach further allows the master function to perform a disruptive adapter data collection while inhibiting performance of disruptive adapter data collection processes by the other (non-master) functions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
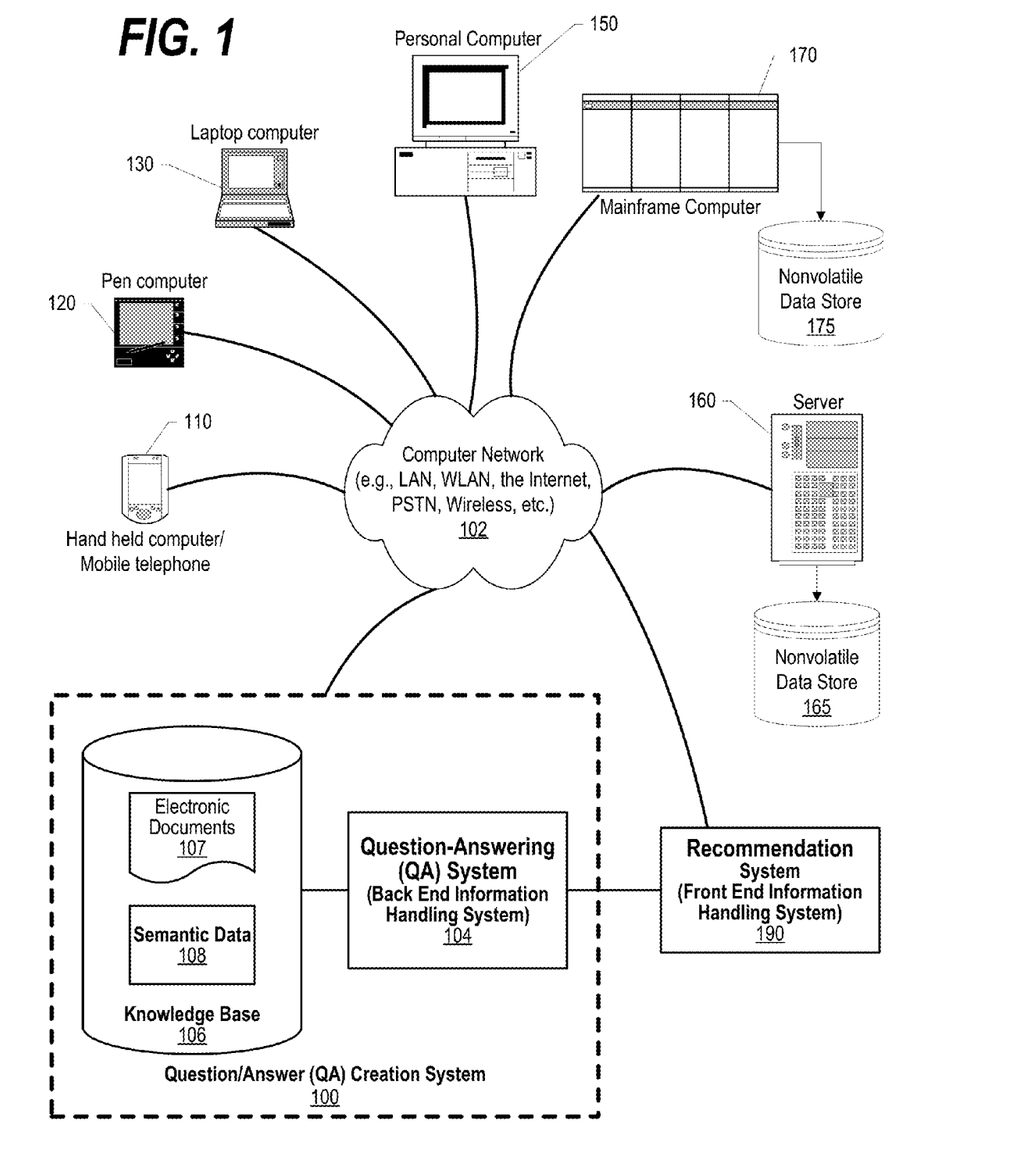
FIG. 1 is a block diagram of a data processing system in which the methods described herein can be implemented.
Figure 2:
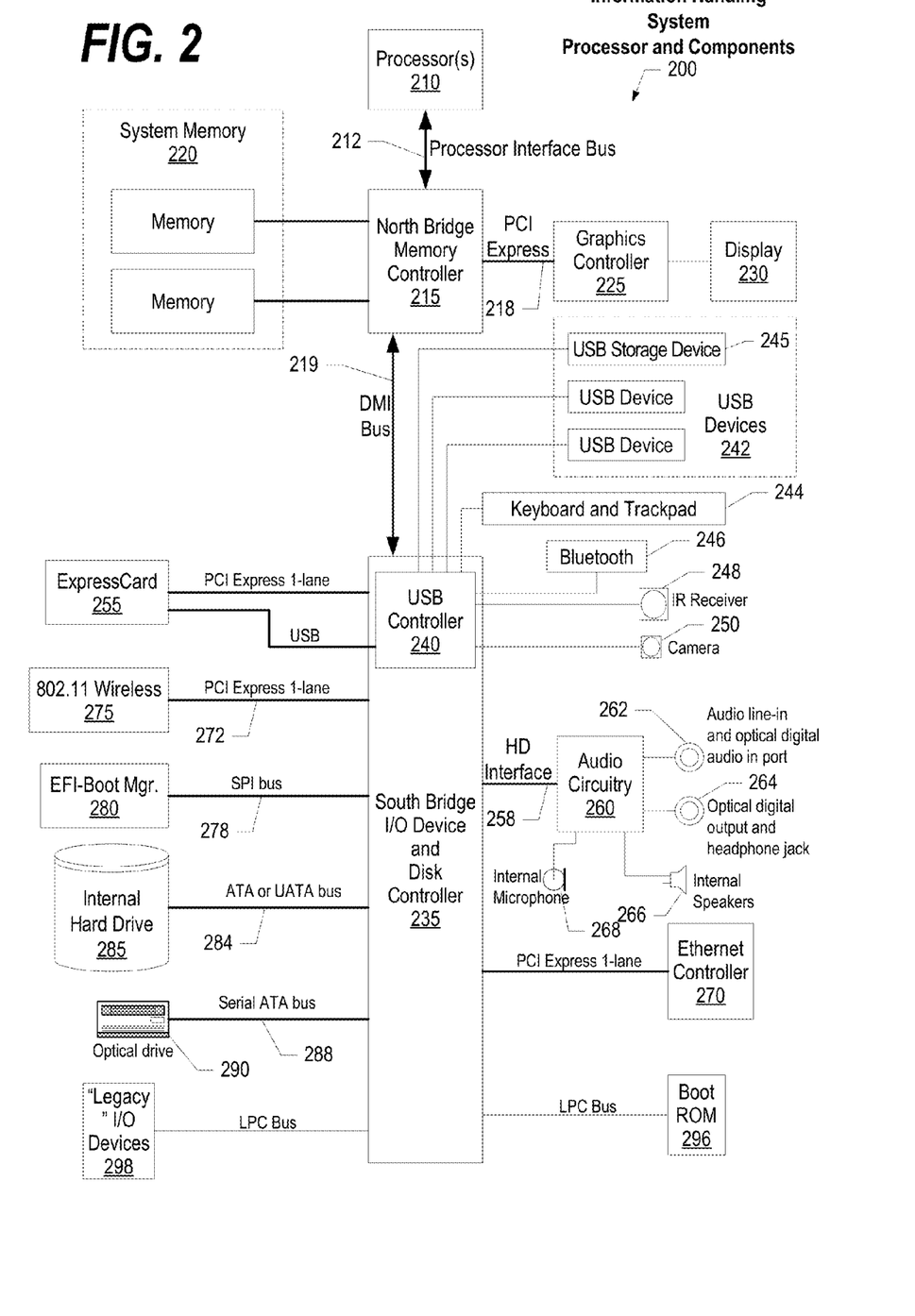
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system and computer network as shown in FIGS. 1-2. In this approach, rather than any functions utilizing a multi-function adapter collecting data in what might be a disruptive manner, one function, designated the "master function" is selected to coordinate data collection from the adapter and is the only function allowed to collect data in what might be a disruptive manner. In one embodiment, when a function identifies a problem with an adapter or otherwise identifies a situation where data collection from the adapter is needed, the function requests election to be the "master" function. In this manner, any of the functions running at the adapter can request election to be the master function when such function identifies a need to collect data from the adapter. In a further embodiment, the master function identifies whether data collection is urgent. For example, if a request is received from an operator to collect data and such request is not urgent, then the master function allows the other function a small amount of time before performing what might be a disruptive data collection process. On the other hand, if the data collection is deemed urgent, such as a detected problem with the adapter, then the master function collects data from the adapter in what might be a disruptive manner at essentially the same time that the other functions are notified that a data collection process is about to begin. The other functions also gather data from the adapter, however non-master functions only gather data in a non-disruptive manner so such data collections do not disrupt the operation of other functions also using the multi-function adapter. When the master detects that its data collection process has completed, as well as the completion of the non-disruptive data collection processes performed by the non-master functions, then the master function signals to the other functions that normal operations can continue at the adapter and the master function relinquishes its role as the master function.

Figure 3:
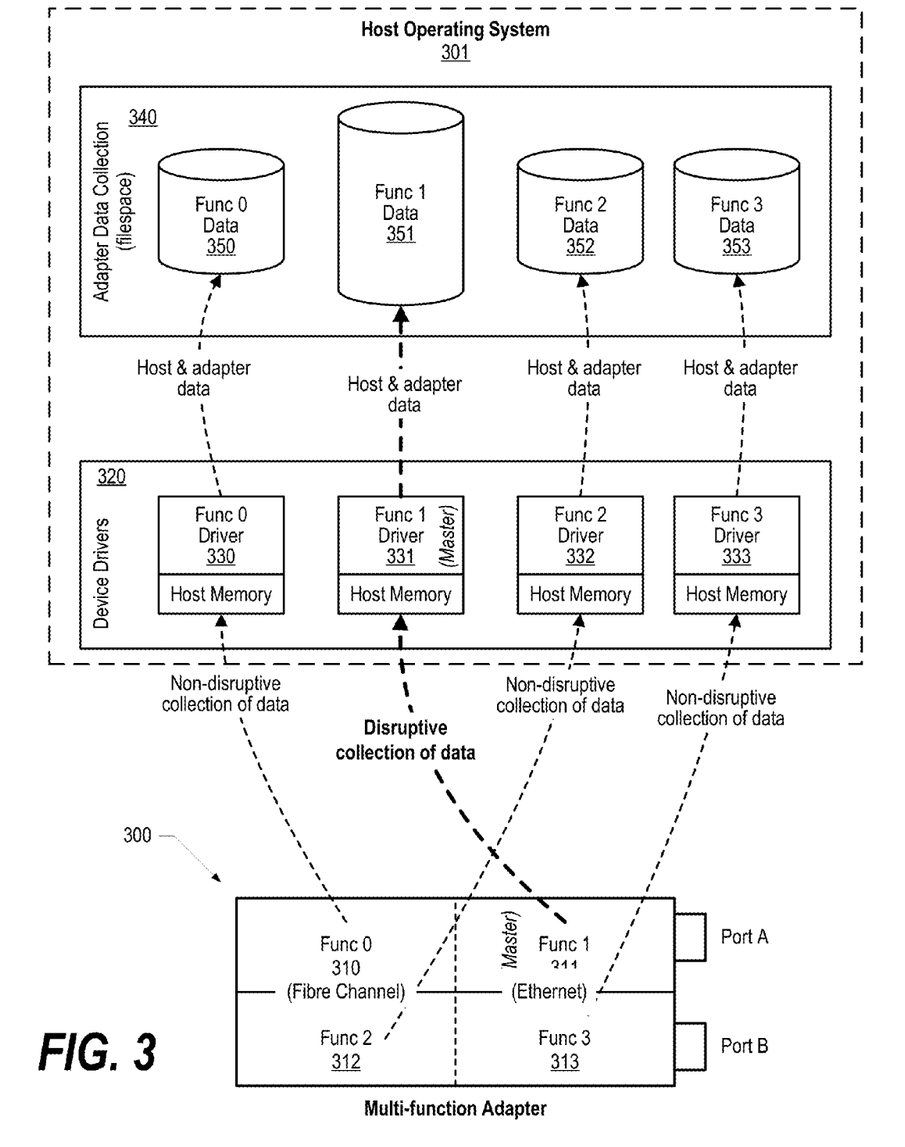
FIG. 3 is a diagram showing a set of functions that operate on a common adapter collecting data from the adapter using a master function.

FIG. 3 is a diagram showing a set of functions that operate on a common adapter collecting data from the adapter using a master function; Four functions (Func 0, 1, 2, and 3) are operating on the system and utilizing multi-function adapter 300. Multi-function adapter 300 can be capable of running multiple protocols. In the example shown, the multi-function adapter is running both a Fibre Channel protocol and an Ethernet protocol with the Fibre Channel protocol being depicted as running on the left side of multi-function adapter 300 (Func 0 (310) and Func 2 (312)) and the Ethernet protocol as being depicted as running on the right side of the adapter (Func 1 (311) and Func 3 (313)). Two ports are shown in the adapter with Port A being depicted as providing I/O for the top half of the multi-function adapter (Func 0 (310) and Func 1 (311)) and Port B being depicted as providing I/O for the bottom half of the multi-function adapter (Func 2 (312) and Func 3 (313)). As shown, a disruptive data collection process that is executed on adapter 300 is capable of disrupting disparate functions that are running different protocols. In order to collect data from adapter 300 in a less disruptive manner, one of the functions is selected, or "elected," to be the "master function" which is then responsible for collecting data from adapter in a less disruptive manner. In one embodiment, any of the functions can be selected as the master function, with the master function typically being the function that first discovers a need to collect data from the adapter.

Communication between the various functions takes place at the operating system level (operating system 301). Device drivers 320 are executed by the operating system to execute the various functions. In the example shown, Func 1 is the function that is selected to be the master. Functions running the same protocol may be different instances of the same driver. For example, since Func 0 and Func 2 are both running the Fibre Channel protocol, they could both be separate instances of the same Fibre Channel driver. Likewise, since Func 1 and Func 3 are both running the Ethernet protocol, they could both be separate instances of the same Ethernet protocol. As separate instances, the various functions maintain their own separate memory spaces on the host (e.g., main system memory managed by operating system 301 and separate from memory provided on adapter 300). The execution instances of the various functions are depicted in device drivers 320 within operating system 301 (Func 0 shown as instance 330, Func 1, shown as instance 331, Func 2 shown as instance 332, and Func 3 shown as instance 333). In one embodiment, each of the drivers is programmed so that functions executed as an instance of the driver is capable of operating in both a master and non-master role. When one of the functions identifies a need to collect data from multi-function adapter, that function attempts to be elected, or selected, as the master function in order to assume the role as master function and coordinate the collection of data from the adapter in a less-disruptive manner.

In the example shown, Func 1 has been selected as the master function. As such, it is the only function allowed to collect data from the adapter disruptively. Further, the master function signals the other (non-master) functions so that the non-master functions also collect adapter-related data. However, as previously mentioned, the non-master functions collect data from adapter 300 in a non-disruptive manner. The data collected by the various functions is stored by the operating system in one or more files. Disk, or filespace, 340 is managed by the operating system and is used to store the collected adapter-related data. In one embodiment, each function stores a separate file with data collected by that function. In the example shown, data collected by Func 0 is stored in file 350, data collected by Func 1 is stored in file 351, data collected by Func 2 is stored in file 352, and data collected by Func 3 is stored in file 353. Data collected by Func 1 is depicted as a somewhat larger file (351) that the data files associated with the other functions as, in the example, Func 1 is serving the role as the master function and, therefore, is likely collecting more data from adapter 300 than is being collected by the other functions.

Figure 4:
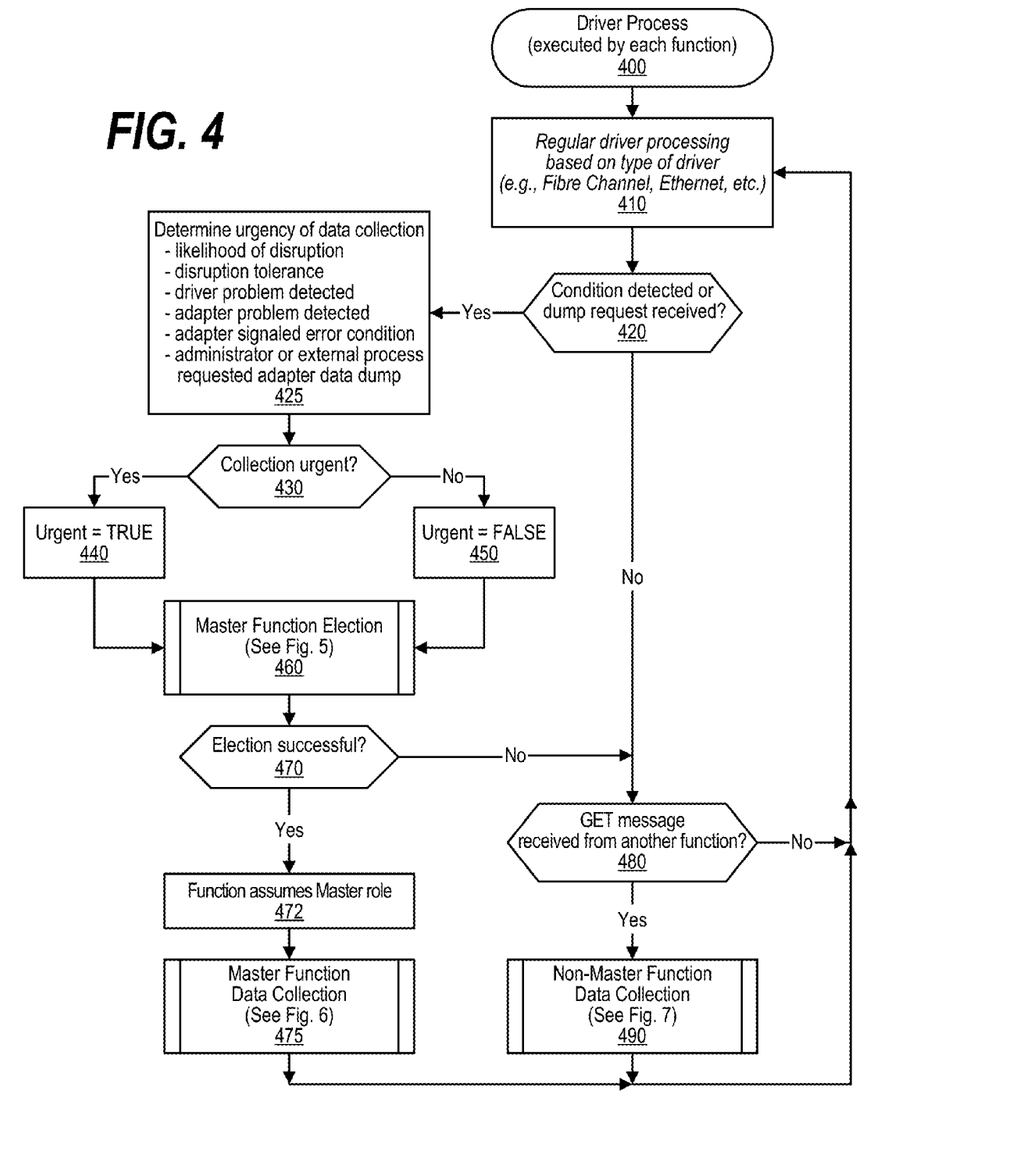
FIG. 4 is a flowchart depicting processing performed at each function that is operating on the common adapter to collect data when necessary.

FIG. 4 is a flowchart depicting processing performed at each function that is operating on the common adapter to collect data when necessary. In one embodiment, the logic shown in FIG. 4 is included in each of the device drivers. Processing commences at 400 whereupon, at step 410, each function is utilizing the multi-function adapter based on the type of device driver being executed for the function (e.g., a Fibre Channel protocol, an Ethernet protocol, etc.).

During normal usage of the adapter by the function, a condition may arise that prompts the function to attempt to collect data from the adapter. A determination is made as to whether such a condition has occurred at the function (decision 420). If such a data collection condition has arisen, then decision 420 branches to the "yes" branch to perform further data collection steps. At step 425, the process determines the urgency of collecting the data from the adapter. Some conditions may prompt an urgent collection of data, while other conditions may allow for a less-urgent collection of data. Factors that might be considered regarding whether the data collection is urgent include: the likelihood of disruption at the adapter, the tolerance of a disruption event at the adapter (by the function or by other functions), whether a device driver problem has been detected, whether an adapter problem has been detected, whether the adapter signaled a problem or error condition, an whether the data collection event is a result of a request received by the function by an administrator (e.g., user of the system, etc.) or from an external process.

A determination is made by the function as to whether data collection is urgent (decision 430). If data collection is deemed urgent, then decision 430 branches to the "yes" branch whereupon, at step 440, a flag is set indicating that the data collection urgency is TRUE. Otherwise, if data collection is not deemed urgent, then decision 430 branches to the "no" branch whereupon, at step 450, the flag is set indicating the data collection urgency is FALSE. Regardless of whether the data collection is urgent, at predefined process 460, the function attempts to be selected (e.g., elected, etc.) as the master function (see FIG. 5 and corresponding text for further processing details). A determination is made as to whether the function was selected to be the master function (decision 470). If the function was selected to be the master function, then decision 470 branches to the "yes" branch whereupon, at step 472, the function assumes the role of the master function for the adapter and, at predefined process 475, the function (now in the role as the master function) performs the master function data collection process (see FIG. 6 and corresponding text for further processing details). Once the master function data collection process has completed, the function relinquishes the role as being the master function and processing loops back to step 410 to continue normal operations using the adapter (e.g., in a non-master function role).

Returning to decision 470, if the function is not selected to be the master function, decision 470 branches to the "no" branch for further non-master processing. The function might not be selected to be the master function if another function has already been selected to be the master function. For example, an adapter error might be detected by multiple functions running at the adapter, and each of the detecting functions might attempt to be selected to be the master function. However, once a first of the functions is selected to be the master functions, the other functions request to be master will be denied. Returning now to decision 420, if this function does not detect a data collection condition or request, decision 420 branches to the "no" branch to identify if any other functions have signaled for a data collection process.

When a function is serving in a non-master function role, it detects whether another function has signaled for a data collection event (decision 480). In one embodiment, a data collection event is signaled by another function (e.g., the master function) using a GET message that is broadcast to the other functions. If another function has signaled for a data collection event, then decision 480 branches to the "yes" branch whereupon, at predefined process 490, the non-master function performs a non-disruptive data collection process (see FIG. 7 and corresponding text for further processing details). Processing then loops back to step 410 to continue normal operations using the adapter. On the other hand, if no other function has signaled a data collection event, then decision 480 branches to the "no" branch bypassing predefined process 490 and loops back to step 410 to continue normal operations using the adapter.

Figure 5:
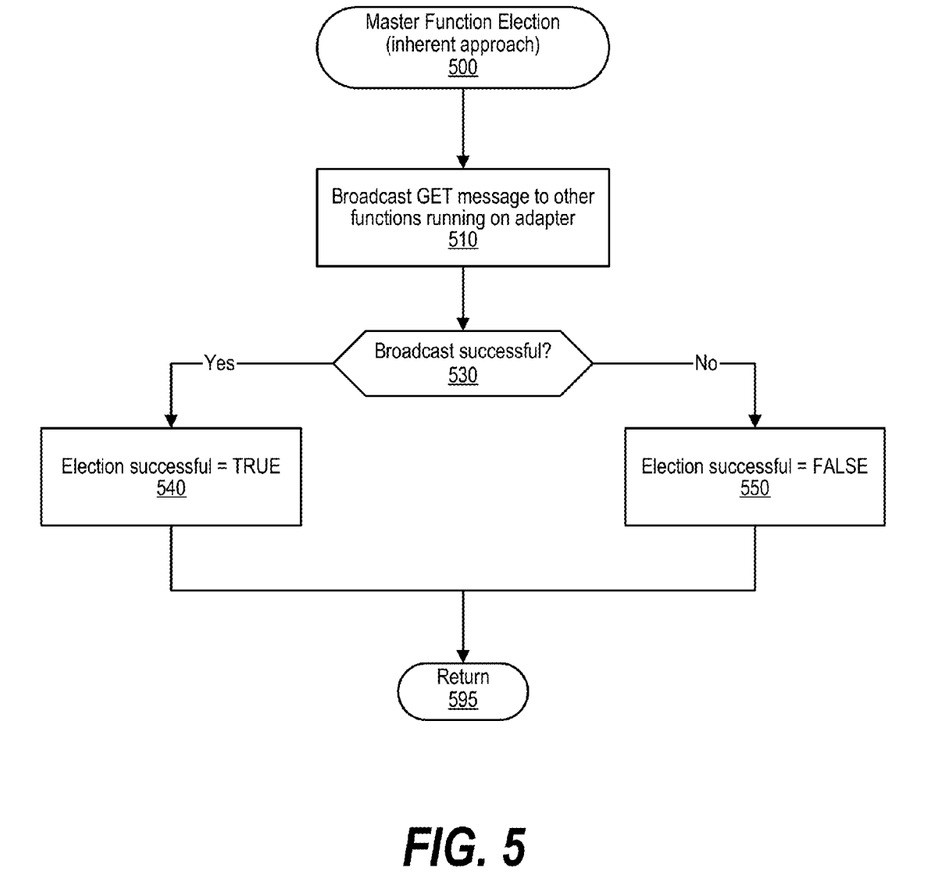
FIG. 5 is a flowchart depicting an inherent approach to electing a master function that collects data from the adapter.

FIG. 5 is a flowchart depicting an inherent approach to electing a master function that collects data from the adapter. As will be appreciated by those skilled in the art, many different approaches can be implemented in order to select, or elect, a function to serve as the master function for the adapter. The approach shown in FIG. 5 is an inherent approach whereby the first function to signal the other functions regarding a data collection event is selected, or elected, to be the master function. In one embodiment, a messaging service is implemented by the operating system, by the various device drivers, or by a device driver manager to facilitate communication between the functions. In a further embodiment, when one function successfully broadcasts a message, or a particular message, to the other functions, then the signaling function is automatically, or inherently, deemed to be the master function. Processing in FIG. 5 is shown commencing at 500 whereupon, at step 510, the function broadcasts a particular message to the other functions running on the adapter. In the example shown, the message is a GET message that further instructs the other functions to commence collecting data from the adapter in a non-disruptive manner. A determination is made as to whether the broadcast message was successful (decision 530). In one embodiment, once a function successfully broadcasts a GET message, then other functions are unable to broadcast another GET message until such time as the master role has been relinquished by the function that first broadcasted the GET message. If the broadcast message was successful, then decision 530 branches to the "yes" branch whereupon, at step 540, a flag is set indicating that the function's selection (or election) to be the master function was successful and the function assumes the master function role until the data collection process is complete. On the other hand, if the selection (or election) was unsuccessful, then decision 530 branches to the "no" branch whereupon, at step 550 the flag is set indicating that the function has not been selected as the master function and that the function continues to serve as a non-master function at the adapter. Processing then returns to the calling routine (see FIG. 4) at 595.

Figure 6:
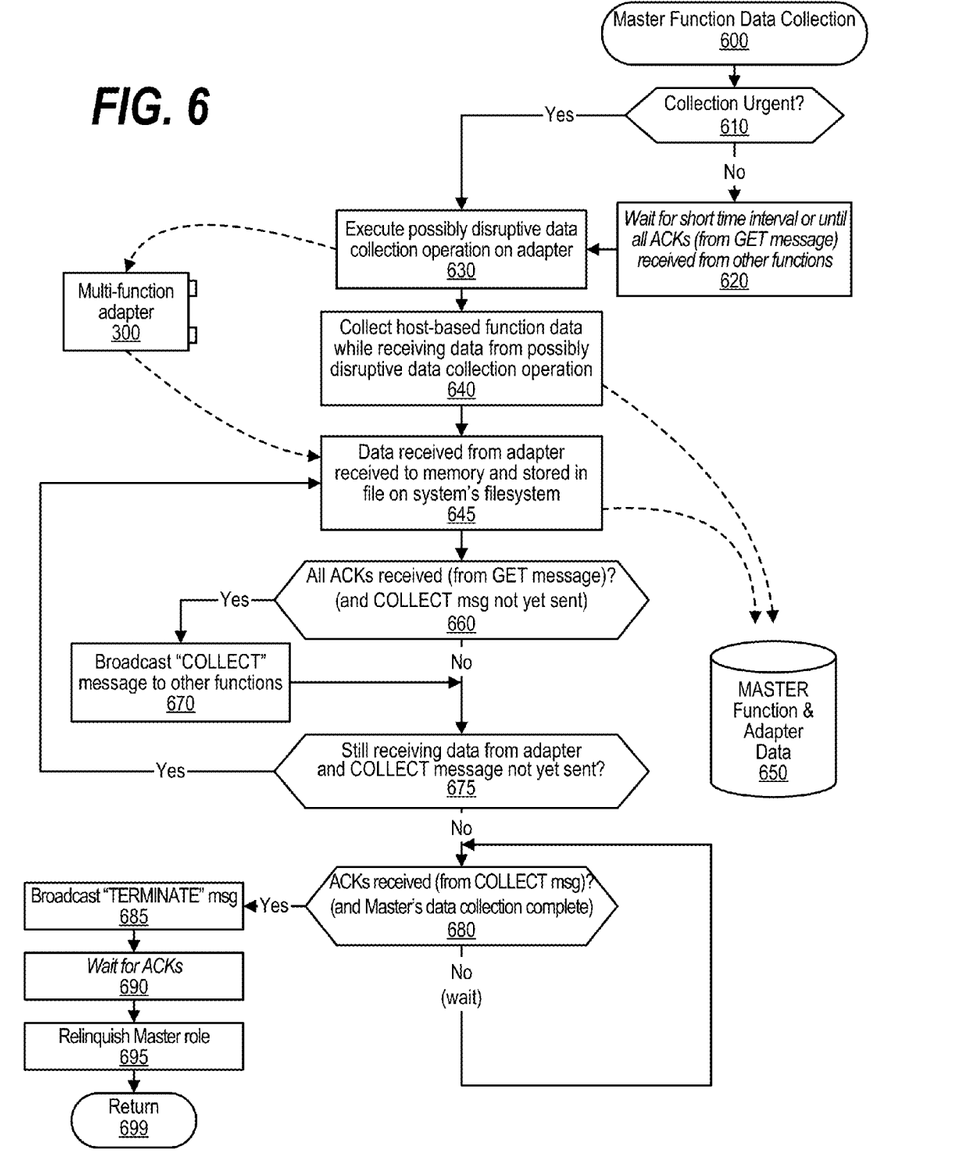
FIG. 6 is a flowchart depicting the steps performed by one of the functions to collect data after being elected the master function.

FIG. 6 is a flowchart depicting the steps performed by one of the functions to collect data after being elected the master function. The master function data collection process commences at 600 whereupon, at step 610, a determination is made as to whether data collection at the adapter was previously deemed urgent (decision 610). If the data collection process was not deemed to be urgent, then decision 610 branches to the "no" branch whereupon, at step 620, the master function waits for a short time period or until all acknowledgements have been received from the other (non-master) functions. This waiting allows the other functions to possibly complete critical processes before the possibly disruptive data collection process begins. On the other hand, if the data collection has been deemed urgent, then decision 610 branches to the "yes" branch to immediately commence collecting adapter-related data using what might be a disruptive data collection operation.

At step 630, the master function executes what might be a possibly disruptive data collection operation on the multi-function adapter 300. At step 640, the master function collects its host-based function data that is associated with the master function (e.g., from memory area 331 shown in FIG. 3, etc.). The data collected by the master function is stored in file 650 which is maintained as a disk file by the operating system (e.g., as in Func 1 data 351 shown in FIG. 3, etc.). Once collected, file 650 can be analyzed by a human operator or process in order to identify a problem or error condition that is occurring (e.g., a bad adapter, etc.). While the host-based data is being collected, at step 645, the master function starts receiving data from the multi-function adapter based on the possibly disruptive data collection request that the master function sent to the multi-function adapter. This adapter data received at step 645 is stored in system memory and then stored in data file 650.

A determination is made as to whether the master function has received an acknowledgement from the other functions responsive to the master function's previous GET message that was broadcast to the other functions (decision 660). If all of the acknowledgements have been received, and the master function has not yet broadcast a COLLECT message, then decision 660 branches to the "yes" branch whereupon, at step 670, the master function broadcasts a COLLECT message to the other (non-master) functions. The COLLECT message informs the other functions that data collection is underway and that, after collecting data using the non-disruptive collection process, the other functions should remain in the data collection routine until further instructed by the master function to resume normal operations. On the other hand, if all of the acknowledgements to the GET message have not been received, or if the COLLECT message has already been broadcasted, then decision 660 branches to the "no" branch bypassing step 670. If one or more of the non-master functions appears to be inoperative or hung with no acknowledgement being received from such inoperative functions, then the acknowledgement can be assumed to have been received from such inoperative function.

A determination is made as to whether the master function is still receiving data from the multi-function adapter and the master function has not yet sent the COLLECT message (decision 675). If the master function is still receiving data from the adapter and the master function has not yet sent the COLLECT message, then decision 675 branches to the "yes" branch which loops back to continue collecting data from the adapter and storing the data in data file 650. This looping continues until all of the data has been received from the adapter and the master function has sent the COLLECT message to the non-master functions, at which point decision 675 branches to the "no" branch to complete the master function process.

A determination is made as to whether acknowledgements have been received from the other functions responsive to the master function's previous COLLECT message that was broadcast to the other functions (decision 680). Once again, if one or more of the non-master functions appears to be inoperative or hung with no acknowledgement being received from such inoperative functions, then the acknowledgement can be assumed to have been received from such inoperative function. If acknowledgements have not been received from the other functions in response to the COLLECT message, then decision 680 branches to the "no" branch which loops back to wait for the acknowledgements.

Once all of the acknowledgements have been received from the other functions responsive to the master function's previous COLLECT message and the master function's data collection process is complete, then decision 680 branches to the "yes" branch to terminate the collection process. At step 685, the master function broadcasts a TERMINATE message to the other (non-master) functions, with the TERMINATE message indicating that the data collection process has completed and the functions can resume normal operations. At step 690, the master function waits for acknowledgements from the other functions responsive to the master function's TERMINATE message. Once the acknowledgements have been received, at step 695, the master function relinquishes its role as the master function and becomes a non-master function. Processing then returns to the calling routine (see FIG. 4) at 699.

Figure 7:
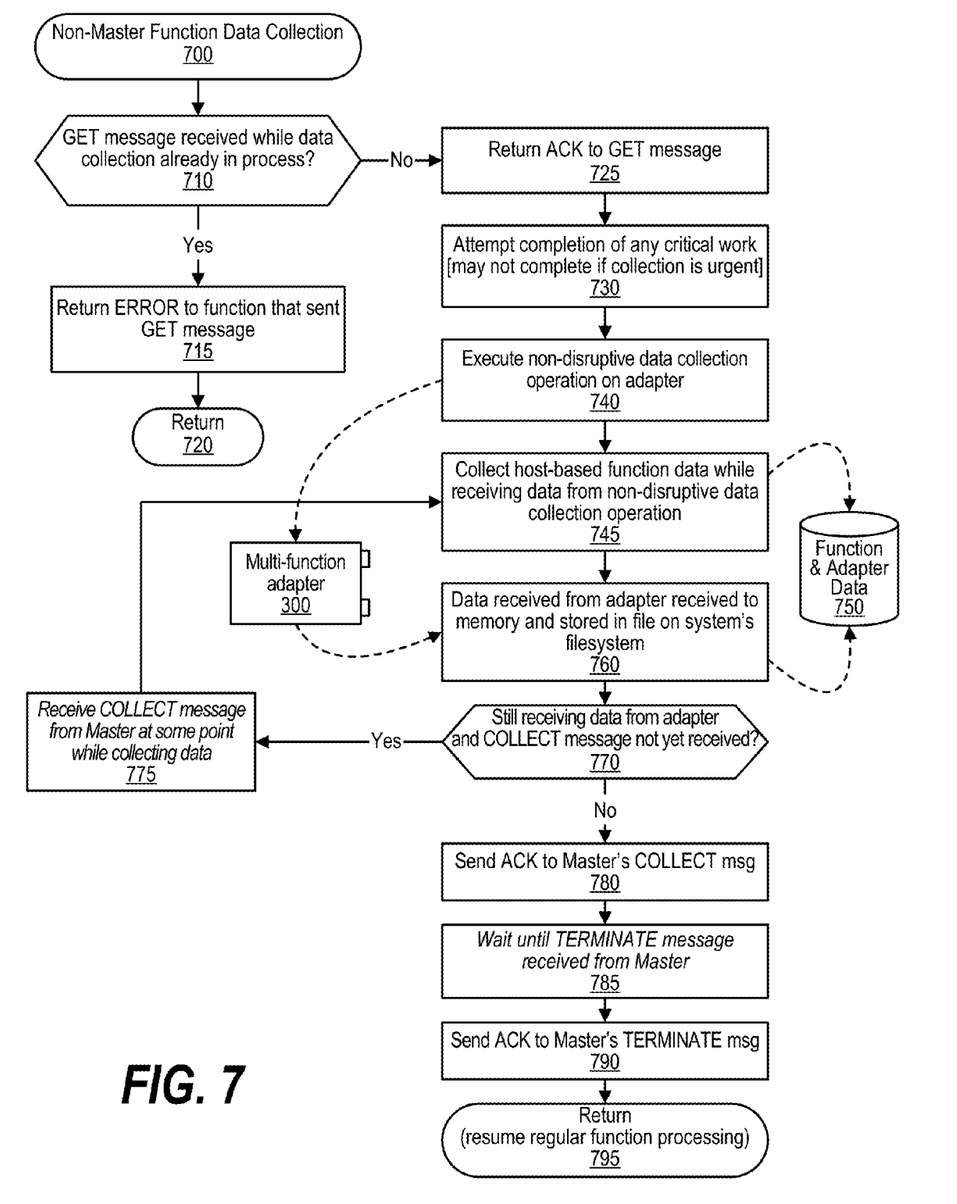
FIG. 7 is a flowchart depicting the steps performed by the non-master functions to communicate with a master function and to collect data in a non-disruptive manner.

FIG. 7 is a flowchart depicting the steps performed by the non-master functions to communicate with a master function and to collect data in a non-disruptive manner. Processing commences at 700. In one embodiment, when a first GET message is broadcast, subsequent functions are inhibited from broadcasting another GET message until the master function has terminated the collection process. However, in an embodiment that does not inhibit the broadcast of subsequent GET messages, it might be possible for a function to receive more than one GET message. In order to prevent such an occurrence, decision 710 checks whether a GET message has been received while the non-master function is already performing a collection process. If a subsequent GET message is received, then decision 710 branches to the "no" branch whereupon, at step 715, an error is returned to the function that broadcasted the GET message to prevent the function from attempting to assume the master function role, and processing returns to the calling function (see FIG. 4) at 720. On the other hand, if the function receives a GET message and the function is not currently performing the collection process, then decision 710 branches to the "no" branch to perform the non-master data collection process.

At step 725, the non-master function returns an acknowledgement to the master function's GET message. At step 730, the non-master function might attempt to complete any critical work that was being performed by the function prior to receiving the GET message. However, if the master function has determined that data collection is urgent, the master function might perform a disruptive data collection process at the adapter which might prevent this function from completing its critical work. At step 740, the non-master function executes a non-disruptive data collection operation on the multi-function adapter. Since the function is not the master function, it is not allowed to perform any disruptive data collection processes on the adapter.

At step 745, the non-master function collects its host-based adapter function data while receiving the requested data from the adapter. At step 760, data is received from the multi-function adapter where it is stored in system memory before being stored in data file 750 (e.g., as in Func data 0 350 in FIG. 3, etc.). Management of data file 750 is performed by the operating system. A determination is made as to whether the non-master function is still receiving data from the adapter in response to the non-disruptive data collection request previously executed by the function on the adapter and the COLLECT message has not yet been received from the master function (decision 770). If data is still being received and if the COLLECT message has not yet been received, decision 770 branches to the "yes" branch which loops back to continue collecting data from the adapter and storing the data in data file 750. At some point while the function is collecting data from the adapter, at step 775, the function receives a COLLECT message that has been broadcast from the master function. The COLLECT message informs the non-master function that the data collection process is currently being performed at the adapter. When the adapter is finished sending data to the non-master function and the non-master function has finished storing the collected adapter data into data file 750 and the COLLECT message has been received, then decision 770 branches to the "no" branch whereupon, at step 780, the non-master function sends an acknowledgement to the master function's COLLECT message, thereby informing the master function that this non-master function has completed its data collection process. The master function will wait until all of the data collection processes have been completed (by the master function and each of the non-master function), before broadcasting a TERMINATE message. At step 785, the non-master function waits until it receives the TERMINATE message from the master function. The TERMINATE function informs the non-master function that the data collection process has completed at the adapter. At step 790, the non-master function sends an acknowledgement to the master function acknowledging the TERMINATE message. Processing then returns to the calling routine (see FIG. 4) at 795 whereupon the non-master function can resume normal function processing (e.g., Fibre Channel processing, Ethernet processing, etc.).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system that includes one or more processors and a memory, that collects data from a multi-function adapter utilized by a plurality of functions, the method comprising:
dynamically determining a master function selected from the plurality of functions;
allowing performance of a disruptive adapter data collection process by the master function; and
inhibiting performance of disruptive adapter data collection processes by the non-master functions.

2. The method of claim 1 further comprising:
selecting one of the plurality of functions to be the master function.

3. The method of claim 2 wherein the selecting comprises a first broadcast message operation from a first of the plurality of functions to the other functions, wherein the first broadcast message operation is performed before a second broadcast operation is performed by a second of the plurality of functions, and wherein the first function is selected to be the master function.

4. The method of claim 2 further comprising:
relinquishing a master role assumed by the master function after collecting data from the multi-function adapter, wherein each of the plurality of functions has a non-master function role after the relinquishing.

5. The method of claim 2 further comprising:
directing each of the non-master functions to perform a non-disruptive data collection process, wherein the directing is performed by the master function;
collecting data from the multi-function adapter using the non-disruptive data collection process by each of the non-master functions; and
collecting data from the multi-function adapter using a disruptive data collection process by the master function.

6. The method of claim 5 further comprising:
prior to collecting the data, determining, by the master function, whether the collection of data is urgent;
in response to determining that the collection of data is non-urgent, waiting a short time interval before collecting the data from the multi-function adapter using the disruptive data collection process, wherein the short time interval allows the non-master functions to complete one or more operations before the disruptive data collection process occurs; and
in response to determining that the collection of data is urgent, immediately collecting the data from the multi-function adapter using the disruptive data collection process.

7. The method of claim 6 wherein one or more of the functions are PCI functions, and wherein the method further comprises:
collecting, by each of the plurality of functions, adapter related data stored in a host memory separate from the multi-function adapter;
determining, by the master function, that the disruptive data collection process has completed and that each of the non-master functions has completed collecting the data from the adapter using the non-disruptive data collection process;
signaling, by the master function, to each of the non-master functions that normal operations can commence in response to the determination; and
relinquishing a master function role previously assumed by the master function so that the master function becomes a non-master function and resumes normal operations, wherein the relinquishing is performed after the determination.

* * * * *